United States Patent [19]
van der Lely

[11] 4,063,596
[45] Dec. 20, 1977

[54] SOIL CULTIVATING MACHINES

[76] Inventor: Cornelis van der Lely, 7, Bruschenrain, Zug, Switzerland

[21] Appl. No.: 627,746

[22] Filed: Oct. 31, 1975

[30] Foreign Application Priority Data

Oct. 31, 1974 Netherlands .......................... 7414213

[51] Int. Cl.² .......................... A01B 9/00; A01B 33/06
[52] U.S. Cl. ......................................... 172/65; 172/49;
172/59; 172/68; 172/524; 172/526
[58] Field of Search ....................... 172/59, 63, 65, 68,
172/522-526, 49

[56] References Cited

U.S. PATENT DOCUMENTS

| 937,607 | 10/1909 | Hoover | 172/526 |
|---|---|---|---|
| 2,678,595 | 5/1954 | Peters | 172/68 |
| 2,792,770 | 5/1957 | Ober | 172/68 |
| 3,774,688 | 11/1973 | van der Lely et al. | 172/59 X |
| 3,946,816 | 3/1976 | van der Lely et al. | 172/65 |

FOREIGN PATENT DOCUMENTS 1,011,208  6/1957  Germany .............................. 172/68

Primary Examiner—Paul E. Shapiro
Attorney, Agent, or Firm—Mason, Mason & Albright

[57] ABSTRACT

A soil cultivating machine or rotary harrow has a row of tined soil working members that are driven about upwardly extending shafts. Further soil working or cultivating members between the driven members are mounted for free rotation about axes also located in the same row which extends transverse to the direction of travel. The further members have tines or blades that are supported on respective arms that extend forwardly and are journalled on vertical shafts at the front of a frame portion. The arm of a pair of blades or a pair of freely rotatable tined members is pivotable to and fro between limit stops to avoid obstacles in or on the ground. The tined members are freely rotatable about upwardly extending axes and the bladed members are freely rotatable about horizontal axes to assist in shedding weeds and other debris.

17 Claims, 5 Drawing Figures

SOIL CULTIVATING MACHINES

This invention relates to soil cultivating machines or implements, such as rotary horrows, such machines being of the kind which comprise a plurality of power-driven soil working members.

According to one aspect of the invention, there is provided a soil cultivating machine of the kind set forth, wherein said power-driven soil working members are arranged in a row which also includes at least one freely rotatable soil cultivating member.

Figure 1:
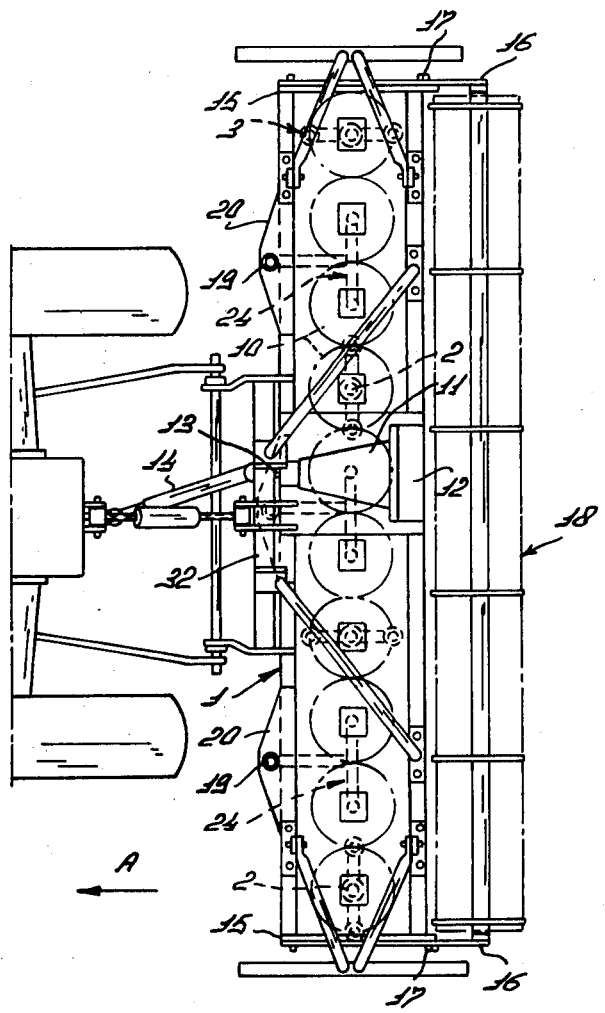
Figure 2:
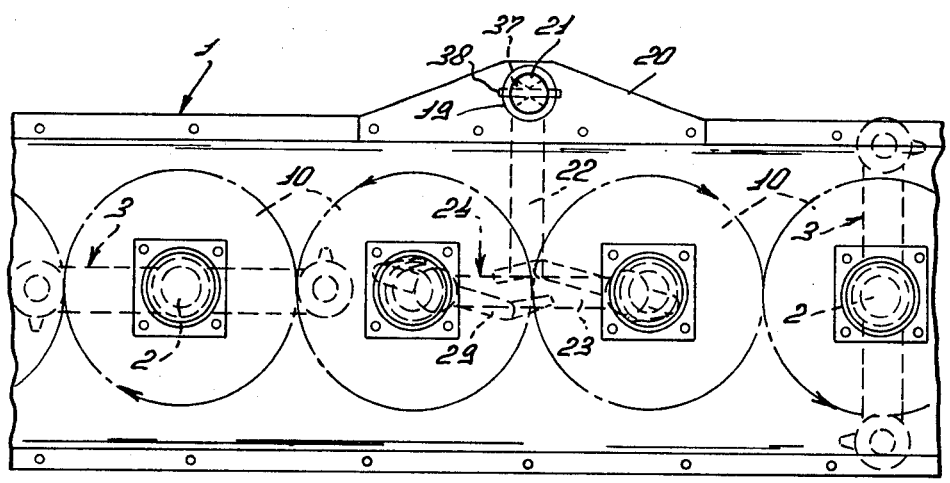
Figure 3:
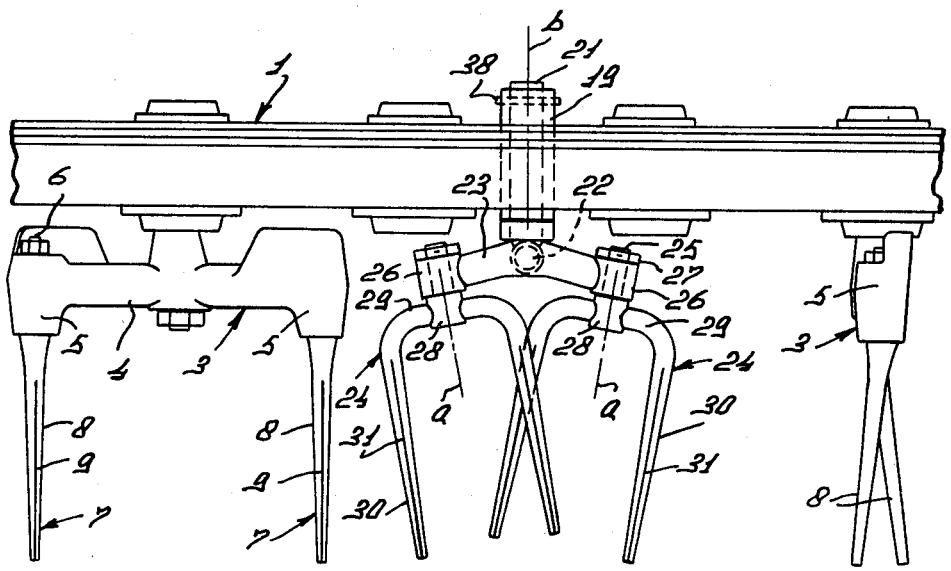
Figure 4:
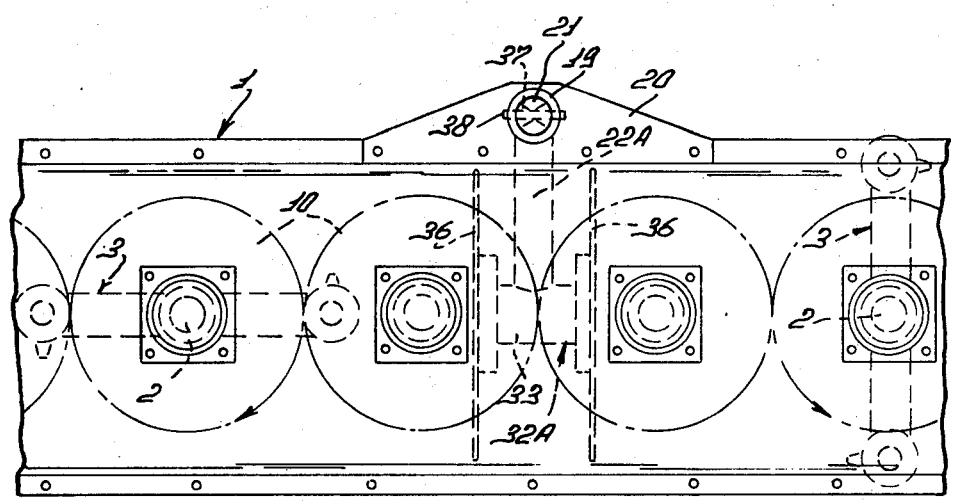
Figure 5:
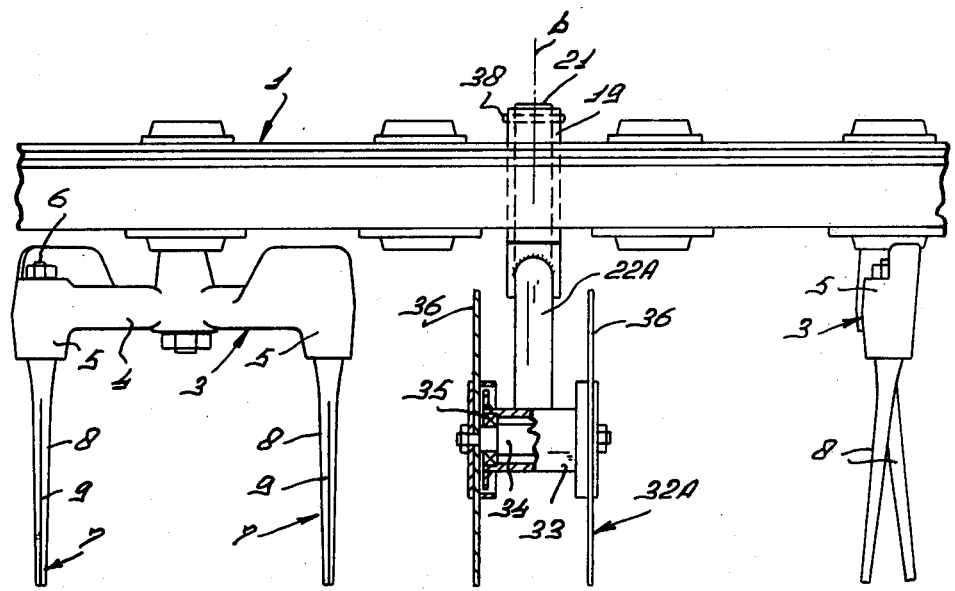

For a better understanding of the invention, and to show how the same may be carried into effect, reference will now be made, by way of example, to the accompanying drawings, in which:

FIG. 1 is a plan view of a soil cultivating machine or implement in accordance with the invention, in the form of a rotary harrow, connected to the rear of an agricultural tractor, FIG. 2 is a plan view, to an enlarged scale, showing parts of the rotary harrow of FIG. 1 in greater detail, FIG. 3 is a rear elevation as seen in the direction indicated by an arrow III in FIG. 2, FIG. 4 is a similar view to FIG. 2 but illustrates an alternative embodiment, and FIG. 5 is a rear elevation as seen in the direction indicated by an arrow V in FIG. 4. de Referring to FIGS. 1 to 3 of the drawings, the soil cultivating machine or implement that is illustrated will hereinafter be referred to, throughout the remainder of the descriptive portion of this Specification, merely as "a rotary harrow" for the sake of brevity. The rotary harrow has a hollow box-shaped frame portion 1 that extends substantially horizontally transverse, and normally substantially horizontally perpendicular, to the intended direction of operative travel of the harrow which is indicated by an arrow A in FIG. 1 of the drawings. A plurality of substantially vertical, or at least upright, shafts 2 are rotatably mounted in bearings carried by upper and lower walls of the frame portion 1, the shafts 2 being equidistantly spaced apart from one another across the transverse width of the frame portion 1. In the example which is being described, there are ten of the shafts 2 arranged in a single row. The two shafts 2 at the opposite ends of the row and the fourth and seventh shafts 2 along that row considered from one end thereof are all provided, at the lowermost ends thereof that project from beneath the bottom of the frame portion 1, with a corresponding soil working member or cultivating member 3. It will thus be seen that there are four of the soil working members or cultivating members 3 that correspond to the first, fourth, seventh and tenth of the shafts 2 along the single row of those shafts. Each soil working member or cultivating member 3 comprises a substantially horizontal support 4 that is firmly, but releasably, secured at substantially its midpoint to the lowermost end of the corresponding shaft 2. The opposite free ends of the supports 4 are provided with substantially vertical sleeve-like tine holders 5 in which fastening portions 6 of corresponding rigid tines 7 are firmly, but releasably, secured with the aid of nuts whose positions can be seen in FIG. 3 of the drawings. Each tine 7 also has a substantially straight operative portion 8 that extends downwardly from the fastening portion 6 concerned with its longitudinal axis inclined at an angle of substantially 8° to the longitudinal axis of the corresponding fastening portion 6 at the integral junction between those two portions 6 and 8. As can be seen at the right-hand side of FIG. 3 of the drawings, the arrangement of the tines 7 is such that their operative portions 8 are inclined rearwardly from top to bottom so as to "trail" with respect to the intended directions of operative rotation of the corresponding soil working members or cultivating members 3 that are indicated by arrows in FIG. 2. Both the front and rear of the operative portion 8 of each tine 7, with respect to the intended direction of operative rotation of the corresponding soil working member or cultivating member 3, are formed with a corresponding projecting rib 9.

Each shaft 2 is provided, inside the hollow frame portion 1, with a straight-toothed or spur-toothed pinion 10, each pinion 10 in the single row thereof having its teeth in mesh with those of its neighbour, or both of its neighbours, in that row. One of the center pair of shafts 2 of the row has an upward extension into a gear box 11 that is mounted on top of the frame portion 1. The gear box 11 contains an upper shaft 13 that extends substantially horizontally parallel to the direction A and a lower parallel shaft that is not visible in the drawings. The lower shaft is in driving connection with the extension of one of the shafts 2 that has been referred to above, by way of meshing bevel pinions, and rear ends of both the lower shaft and the upper shaft 13 project through a rear wall of the gear box 11 and into a change-speed gear 12 that is secured to the back of that gear box. The ends of the two shafts that project into the change-speed gear 12 are splined and are arranged to receive chosen pairs of interchangeable and/or exchangeable straight-toothed or spur-toothed pinions. The particular pair of pinions that is chosen, and its arrangement on the two shafts, dictates the transmission ratio between the lower shaft and the upper shaft 13 in the gear box 11 and thus enables the substantially vertical shafts 2 to be rotated at different speeds without having to alter the input speed of rotation that is applied to the upper shaft 13. The leading end of the upper shaft 13 project forwardly from the front of the gear box 11 and is there splined or otherwise keyed to enable it to be placed in driven connection with the power take-off shaft of an agricultural tractor or other operating vehicle through the intermediary of a telescopic transmission shaft 14, which is of a construction that is known per se, having universal joints at its opposite ends.

The opposite ends of the hollow box-shaped frame portion 1 are closed by corresponding substantially vertically disposed sector-shaped end plates 15 and arms 16 are turnable upwardly and downwardly alongside those end plates 15 about strong pivots that are located at the tops and fronts of the end plates 15 with respect to the direction A to define a substantially horizontal axis that is transverse, and normally substantially perpendicular, to the direction A. Lowermost and rearmost ends of the arms 16 have a rotatable supporting and crumbling member, in the form of an open ground roller 18 that works the soil, mounted between them so as to be rotatable about an axis that is substantially parallel to the row of shafts 2 and to the axis about which the arms 16 are upwardly and downwardly turnable relative to the frame portion end plates 15. The ground roller 18 comprises a central axially extending support that is preferably of tubular construction and a plurality of elongate elements that are arranged at the periphery of the roller at substantially regularly spaced apart intervals around its axis of rotation. The elongate elements are not illustrated in the drawings but extend either parallel to the axis of rotation of the roller 18 or helically around that axis. Rearmost edge regions of the sector-shaped end plates 15 of the frame portion 1 are formed with slots or with rows of holes and bolts 17 or equivalent fastening members are entered through single holes in the arms 16 and through said slots or chosen ones of the alternative holes. It will be evident that the bolts 17 can be employed to retain the arms 16, and thus the roller 18, in a chosen angular setting about the pivotal connection of those arms to the frame portion 1.

The front of the hollow frame portion 1 is provided at three locations which are midway, when viewed in the direction A, between the first and fourth shafts 2, between the fourth and seventh shafts 2 and between the seventh and tenth shafts 2 of the row, respectively, with substantially vertical sleeve bearings 19 that are carried by plates 20 which project forwardly from the front of the frame portion 1. Each sleeve bearing 19 has a corresponding substantially vertical shaft 21 turnably journalled in it, the lower end of each shaft 21 being rigidly connected to the leading end of a corresponding substantially horizontal arm 22. Each arm 22 is normally substantially parallel to the direction A and extends rearwardly, with respect to that direction, from the connection of its leading end to the foot of the corresponding shaft 21. The rear end of each arm 22 has two straight supports 23 rigidly secured to it so as to extend away from the arm 22 in opposite directions that are both parallel, as seen in plan view (FIG. 2), to the transverse length of the frame portion 1. However, as seen in rear elevation (FIG. 3), both supports 23 of each pair are inclined downwardly at equal angles from the corresponding arm 22 towards their free ends. Each of those free ends has a corresponding freely rotatable cultivating member 24 connected to it. The free ends of the supports 23 carry corresponding sleeve bearings 26 in which shafts 25 are rotatably journalled, the shafts 25 being retained against significant axial displacement in the sleeve bearings 26 by rings 27 at their upper ends and hub portions 28 of the corresponding cultivating members 25 at their lower ends, said hub portions 28 being greater in diameter than the shafts 25. Supports 29 project in diametrically opposed relationship from opposite sides of each hub portion 28 and are perpendicular, or substantially perpendicular, to the longitudinal axis $a$ of the corresponding shaft 25. Each support 29 is straight for a predetermined distance after which it merges, by way of a substantially 90° downwardly directed bend, into a rigid tine 30 that is parallel, or substantially parallel, to the corresponding axes $a$. Each tine 30 tapers gently towards its lowermost free end or tip and is formed at both its front and rear, with respect to the usual direction of rotation of the corresponding cultivating member 24 around the axes $a$ concerned, with a rib 31. The two axes $a$ that correspond to the two cultivating members 24 of each pair are in downwardly convergent relationship and intersect at an imaginary point located below the free ends or tips of the four tines 30 of those two members 24. The arrangement is such that, as will be evident from FIG. 3 of the drawings, the circles that are traced by the free ends or tips of the tines 30 of the two cultivating members 24 of each pair overlap one another. As seen in plan view (FIGS. 1 and 2), the ten shafts 2 and the six shafts 25 are contained in a single substantially vertical plane that is transverse, and normally substantially perpendicular, to the direction A. A coupling member or trestle 32 of generally triangular configuration is secured to the frame portion 1 at the front thereof and is constructed for connection to the three-point lifting device or hitch at the rear of an agricultural tractor or other operating vehicle in a manner which is generally known per se and which is illustrated in outline in FIG. 1 of the drawings.

In the use of the rotary harrow that has been described with reference to FIGS. 1 to 3 of the drawings, the coupling member or trestle 32 is connected to the three-point lifting device or hitch at the rear of an agricultural tractor or other operating vehicle and the leading splined or otherwise keyed end of the upper shaft 13 of the gear box 11 is placed in driven connection with the power take-off shaft of the same tractor or other operating vehicle by way of the telescopic transmission shaft 14 that has universal joints at its opposite ends. The speed of rotation of the shafts 2, and thus of the power-driven soil working members or cultivating members 3, is given the desired value by arranging an appropriate pair of toothed pinions within the change-speed gear 12. The depth of penetration of the tines 7 and 30 into the soil is dictated by setting the level of the axis of rotation of the roller 18 relative to the level of the remainder of the harrow by adjustment of the arms 16 as previously described. These adjustments are made having regard to the nature and condition of the soil that is to be cultivated and with regard to the degree of fineness thereof that is required at the end of the operation. As the harrow moves over a field in the direction A, the shafts 2 are driven to rotate in the directions that are indicated by arrows in FIG. 2 of the drawings so that two of the soil working members or cultivating members 3 revolve in one direction while the other two revolve in the opposite direction. The freely rotatable cultivating members 24 also revolve more or less regularly around the corresponding axes $a$ because of the inclination of those axes to the vertical and the resultant dissimilar depth of penetration of the two tines 30 of each member 24 into the soil. The directions of rotation of the cultivating members 24 are those that are indicated by arrows in FIG. 2 of the drawings although it will be realised that stones and other obstacles that are met with may sometimes cause at least momentary periods of partial revolution in opposite directions. In addition to revolving around the axes $a$, the two members 24 of each pair are bodily deflectable in either direction about the longitudinal axis $b$ of the corresponding substantially vertical shaft 21. The three axes $b$ are, it will be noted, spaced forwardly from a plane containing the shafts 2 and 25 with respect to the direction A.

The rotary harrow that has been described has a considerably reduced number of the power-driven soil working members or cultivating members 3 as compared with known rotary harrows that are of comparable width and that have generally similar driven soil working members or cultivating members. The use of the freely rotatable cultivating members 24 between the driven soil working members or cultivating members 3 produces effective cultivation of the soil even when that soil is very stony and/or is/badly infested with weeds. Very little, if any, clogging takes place because the freely rotatable members 24 that are located between the driven members 3 can deflect, in pairs, about the corresponding axes $b$ in directions that are transverse to the direction A and will thus readily release any adhering weeds and can deflect when a stone or the like is met with in the soil.

FIGS. 4 and 5 of the drawings illustrate an alternative construction in which the arms 22 are replaced by arms 22A that are bent over downwardly at locations which, in plan view, are close to the center of the frame portion 1 when considered in the direction A (FIG. 1). The lowermost and rearmost free end of each arm 22A carries a corresponding substantially horizontal sleeve 33 whose longitudinal axis is perpendicular or substantially perpendicular to the direction A. A rotary shaft 34 is rotatably mounted in each sleeve 33 with the aid of two ball bearings 35 that are located at the opposite ends of the sleeve 33 concerned. The ends of each shaft 34 that project beyond the opposite ends of the corresponding sleeve 33 have the centers of blade discs 36 firmly but releasably secured to them. The two blade discs 36 of each pair are substantially vertically disposed, extend in parallel relationship at opposite sides of the corresponding arm 22A, and are also normally substantially parallel to the direction A. When the two blade discs 36 of each pair are strictly parallel to the direction A, the longitudinal axis of the corresponding shaft 34 is contained in a substantially vertical plane which also contains the longitudinal axes of all ten of the shafts 2. When the rotary harrow is in operation, the discs 36 will tend to rotate, with their shafts 34, because lower regions of those discs will be beneath the ground surface while upper regions thereof will not. The rotation will be more or less continuous but not uniformly regular because of the constantly varying nature of the soil which the discs will meet and the stones and other obstacles which they will encounter. The blade discs 36 constitute freely rotatable cultivating members that are generally indicated by the reference 32A, and three substantially horizontal axes that are constituted by the shafts 34 normally being in substantial alignment in a direction that is transverse to the direction A but each arm 22A and the two discs 36 which it indirectly carries being capable of deflecting about the corresponding substantially vertical axis $b$ to enable the discs 36 to deflect to one side or the other, in a direction that is transverse to the direction A, to enable the discs 36 to avoid large stones and other more or less fixed obstacles. The discs 36 effectively cultivate the strips of land that are located between the driven soil working members or cultivating members 3, the rotation of the discs 36 being effective in releasing temporarily adhering weeds and the like and the lateral deflectability of the discs being sufficient to avoid stones and other potentially damaging obstacles. Instead of having plan circular edges, the blade discs 36 may have toothed or serrated edges and/or may be substantially cap-shaped discs. The releasability of the discs 36 from the shafts 34 enables discs of different formations to be substituted when the operating conditions make such substitution desirable.

In both of the embodiments that have been described, the upper end of each substantially vertical shaft 21 is recessed to form stops 37 whose shapes can be seen in FIG. 4 of the drawings. Releasable pins 38 are entered diagonally through the walls of the sleeve bearings 19 and through the recesses in the upper ends of the shafts 21. The stops 37 co-operate with the pins 38 in limiting the angular extents to which the arms 22 or 22A can turn about the axes $b$, the purpose of this arrangement being to ensure that neither the cultivating members 24 nor the cultivating members 32A can turn so far about the corresponding axes $b$ as to bring them into fouling relationship with the neighbouring power-driven soil working members or cultivating members 3. If desired, spring mechanisms may be provided at the opposite sides of the arms 22 or 22A to tend to maintain those arms in substantially central equilibrium positions in which the arms, as seen in plan view, are parallel to the direction A. Such centering spring mechanisms are not illustrated in the accompanying drawings.

Although various features of the two rotary harrow constructions that have been described and/or that are illustrated in the accompanying drawings will be set forth in the following claims as inventive features, it is emphasised that the invention is not necessarily limited to those features and that it includes within its scope each of the parts of each rotary harrow embodiment that has been described and/or that is illustrated in the accompanying drawings both individually and in various combinations.

What we claim is:

1. A soil cultivating machine comprising a frame and a plurality of driven soil working members with tine means mounted for rotation on corresponding upwardly extending shafts, driving means engaging said shafts to rotate said members about axes defined by said shafts, said shafts being positioned in a row that extends transverse to the direction of travel of the machine, a plurality of further soil working members being pivotably mounted on said machine and freely rotatable about respective axes in general alignment with said row, said further members each comprising at least one tine, the tines of adjacent further members being positioned to work overlapping strips of soil during rotational operation.

2. A machine as claimed in claim 1, wherein each freely rotatable soil cultivating member is pivotable about a non-horizontal axis that is located forwardly thereof with respect to the normal direction of travel of said machine.

3. A machine as claimed in claim 2, wherein, when said machine is viewed in the direction of operative travel, each nonhorizontal pivot axis is located about midway between the axes or rotation of two of said driven members and said pivot axis is located adjacent the front of a frame portion of said frame which supports all of the soil working members.

4. A soil cultivating machine comprising a frame and a plurality of driven soil working members with tine means mouted for rotation on corresponding upwardly extending shafts, driving means engaging said shafts to rotate said members about axes defined by said shafts, said shafts being positioned in a row that extends transverse to the direction of travel of the machine, further soil working members on said machine and said further members being freely rotatable about respective further shafts, said further shafts being positioned in general alignment with said row and pivotably mounted on the machine, each of said further members being displaceable as a unit, to and fro, during operation, at least two of said further cultivating members being positioned side-by-side between two neighboring driven members, each of said further members comprising at least one tine, said first mentioned members and further members being positioned adjacent one another to work overlapping strips of land during operation.

5. A soil cultivating machine comprising a frame and a plurality of driven soil working members with tine means mounted for rotation on corresponding upwardly extending shafts, driving means engaging said shafts to rotate said members about axes defined by said shafts, said shafts being positioned in a row that extends transverse to the direction of travel of the machine, further soil working members being pivotably mounted on said frame and said further members being freely rotatable about axes that are inclined with respect to the axes of rotation of said driven soil working members, said inclined axes being located in general alignment with said row and at least one of said further soil working members comprising at least one tine.

6. A machine as claimed in claim 5, wherein said further soil working members are pivotable about non-horizontal axes located forwardly of said row with respect to the direction of machine travel.

7. A machine as claimed in claim 5, wherein there are two neighbouring, freely rotatable soil working members that are mounted in co-operating relationship and said neighbouring members are displaceable about a common pivot axis.

8. A machine as claimed in claim 5, wherein each further member comprises two substantially parallel tines which are substantially diametrically opposed with respect to a corresponding axis of rotation about which that member is freely pivotable.

9. A machine as claimed in claim 5, wherein each further member has a pair of tines and each tine has an operative portion that is non-parallel to a corresponding axis of rotation of that member, each operative portion extending in a trailing position with respect to the normal direction of operative rotation of said further member.

10. A machine as claimed in claim 9, wherein said tines are formed integrally with supports and the latter are connected to respective shafts that define axes about which said further members are freely rotatable.

11. A machine as claimed in claim 5, wherein stop means is positioned for limiting the angular displaceability of each further member.

12. A machine as claimed in claim 5, wherein each driven soil working member has two tines and each tine comprises a substantially straight operative portion that is substantially parallel to the operative portion of the other tine, the operative portion of one tine being in substantially diametrically opposed relationship therewith relative to the shaft of the corresponding driven member.

13. A machine as claimed in claim 5, wherein said freely rotatable further members are positioned between two of said driven soil working members in said row, the shafts of said driven soil working members being journalled in an elongated frame portion that extends substantially parallel to said row.

14. A soil cultivating machine comprising a frame and a plurality of driven soil working members with tine means mounted for rotation on corresponding upwardly extending shafts, driving means engaging said shafts to rotate said members about axes defined by said shafts, said shafts being positioned in a row that extends transverse to the direction of travel of the machine, a plurality of further soil working members being pivotably mounted on said machine and freely rotatable about respective axes that are inclined to the axes of rotation of said driven soil working members and said respective axes extending in general alignment with said row, said further members each comprising at least one soil working tool and being turnable about an upwardly extending pivot axis of a connection to the frame located forwardly of said row, with respect to the normal direction of machine travel.

15. A machine as claimed in claim 14, wherein each pivot axis comprises the longitudinal axis of a shaft element secured to an arm and at least one of said further members is mounted for free rotation on support means on said arm.

16. A machine as claimed in claim 15, wherein each said arm has two of said further soil working members that are freely rotatable.

17. A machine as claimed in claim 16, wherein the axes of rotation of said two further soil working members intersect one another.

* * * * *